United States Patent [19]

Austin

[11] Patent Number: 4,834,512
[45] Date of Patent: May 30, 1989

[54] THREE-DIMENSIONAL DISPLAY

[75] Inventor: Fred L. Austin, Anaheim, Calif.

[73] Assignee: Hughes Aircraft Company, Los Angeles, Calif.

[21] Appl. No.: 684,512

[22] Filed: Dec. 21, 1984

[51] Int. Cl.$^4$ .......................... G02B 1/06; G02B 27/22
[52] U.S. Cl. ..................................... 350/419; 350/144
[58] Field of Search ........................ 350/418, 419, 144

[56] References Cited

U.S. PATENT DOCUMENTS

| | | | |
|---|---|---|---|
| 2,836,101 | 5/1958 | DeSwart | 350/419 |
| 3,161,718 | 12/1964 | DeLuca | 350/419 |
| 3,305,294 | 2/1967 | Alvarez | 351/169 |
| 3,493,290 | 2/1970 | Traub | 350/419 X |
| 3,632,184 | 1/1972 | King | 350/144 X |
| 4,130,832 | 12/1978 | Sher | 350/144 X |

OTHER PUBLICATIONS

Genisco Computers Corp. brochure, dated 1981, "SpaceGraph—the Ture 3D Display System ... ".
Electronics, Jul. 28, 1981, "Terminal Puts Three-Dimensional Graphics on Solid Ground", H. S. Stover, Genisco Computers Corporation.

*Primary Examiner*—John K. Corbin
*Assistant Examiner*—Scott J. Sugarman
*Attorney, Agent, or Firm*—Thomas A. Runk; A. W. Karambelas

[57] ABSTRACT

A three-dimensional display is disclosed which uses a variable focal length lens through which two-dimensional images of an object are viewed. In one embodiment, a sequence of different images representative of cross sections of the object along its depth dimension are presented by a two-dimensional display apparatus such as a high resolution CRT. The viewer sees these two-dimensional images of the object through the variable focal length lens. The focal length of the lens is changed in synchronization with the two-dimensional images such that each cross section image is seen at a different focal length, thus resulting in a three-dimensional image of the object. The rate of change of the two-dimensional images and the focal length of the lens is higher than the retention rate of the eye of the viewer, thus the images presented appear to fuse into a coherent three-dimensional image. Also disclosed is a fluid-filled lens having an optically transparent elastic membrane for one optical surface which changes the lens focal length by changing membrane curvature in response to fluid pressure changes. A controller is used to control the sequence of two-dimensional images presented and the fluid pressure of the lens. The controller may also size particular two-dimensional images of the object to produce a proper perspective in the three-dimensional image.

16 Claims, 2 Drawing Sheets

THREE-DIMENSIONAL DISPLAY

BACKGROUND OF THE INVENTION

The invention relates generally to displays and, in particular, to displays for producing three-dimensional images.

Displays presenting three-dimensional images are useful in a wide variety of applications. Prior techniques for such displays include the use of a lenticular lens to create a stereo image resulting in the illusion of depth. However, this system requires that the viewer be in a specific location to perceive the three-dimensional effect presented. Another technique is the use of two different colors or the use of opposite planes of polarization in the images to create the illusion of depth. However, the usefulness of both systems depends upon the viewer wearing special glasses.

Another technique for a three-dimensional display includes using a flat plate mirror for reflecting the images of a flat screen cathode ray tube back and forth along the Z axis (depth axis). This technique, better known as beamsplitting, typically uses a partially silvered mirror which passes some of the image and reflects some. The reflected image is displayed to the viewer as well as the passed image and an illusion of depth is created due to the optical pathlength differences between the images. In this technique, the viewer is confined to viewing the display within a relatively narrow angle from the depth or Z axis of the display, i.e., the axis which is perpendicular to the display screen and projects out of and into the screen. When the viewer moves out of that angle, the illusion of depth to the displayed object becomes distorted and eventually vanishes.

A further technique is the use of a flexible, circular, plastic plate mirror mounted on a circular rubber hinge to reflect the flat image of a cathode ray tube. The mechanical driving force moving the mirror toward and away from the viewer to give the illusion of depth is a low frequency audio speaker. Damping means for the mirror are used to tune it to the fundamental frequency. In many cases, the mechanics of the damping means become very complex and result in a complex, sensitive, and expensive system which is difficult to militarize. Also a system in accordance with this technique is relatively large since reflection is used.

A further problem in some three-dimensional display techniques is a lack of depth perception. In some cases, the viewer could not be sure if different objects were at the same or slightly different depths in the display.

Accordingly, it is an object of the invention to provide an improved display for presenting three-dimensional images of objects.

It is also an object of the invention to provide a three-dimensional display which can be viewed from a relatively wide angle without losing the depth dimension of the displayed image.

It is also an object of the invention to provide a three-dimensional display where the viewer does not need special hardware such as special glasses, to see the displayed three-dimensional image.

It is also an object of the invention to provide a three-dimensional display which is easier to construct and maintain, can be militarized, is relatively compact, and requires less special handling.

SUMMARY OF THE INVENTION

The foregoing objects and other objects are attained by the invention wherein there is provided a variable focal length lens positioned in front of a two-dimensional display apparatus. The viewer sees the two-dimensional display through the lens. A controller is used to vary the focal length of the lens according to the particular two-dimensional image being displayed. A three-dimensional image is achieved by displaying representative cross-sectional images of the object at certain points along its depth dimension on the twodimensional display apparatus while varying the focal length of the lens. The two-dimensional display apparatus and the lens may be synchronized by the controller so that the display apparatus presents a particular sequence of cross-sectional images while the focal length of the lens is varied through a plurality of focal lengths in a corresponding, particular sequence. This sequencing is performed at a rate in excess of the retention rate of the human eye so that the images of the object appear to fuse into a coherent three-dimensional volume image. The controller may also size particular two-dimensional images displayed to produce a proper perspective in the three-dimensional image when viewed through the lens.

In one embodiment, a fluid filled lens is used. One optical surface comprises an optically transparent elastic membrane. The opposing optical surface comprises a rigid material which can be shaped to correct for aberrations such as spherical and chromatic induced by the elastic membrane or otherwise existing in the lens. The lens may be oriented in the three-dimensional display so that the elastic membrane is facing the two-dimensional display apparatus and the rigid lens surface is facing outward. Thus, the critical optical surface; i.e., the moving elastic membrane, is protected.

The fluid medium is selected to have an optical index of refraction for producing the required change in focal length of the lens for the depth of the object displayed. To vary the curvature of the elastic membrane, and so to change the focal length of the lens, the pressure of the fluid in the lens is modulated. This may be accomplished by a tube and piston assembly connected to the lens. Moving the piston changes the pressure in the lens thereby stretching or relaxing the elastic membrane.

The viewer of a three-dimensional image presented by a display in accordance with the invention is not restricted to viewing the display within certain angles and has the ability to see different areas of the displayed object from different angles without losing the three-dimensional display effect. For example, where a frontal view of an object is displayed, the viewer can view the display from a higher angle to see the top detail of the object, from a lower angle to see the bottom detail of the object, or from either side angles to see th side details of the object. The viewer does not need special glasses or other hardware to see the three-dimensional image displayed. High resolution may be obtained by using a high resolution, two dimensional display apparatus and displaying closely spaced, representative cross-sectional images of the object. As an example, the display of one hundred different cross-sectional images of an object which is 100 millimeters in depth will result in a higher resolution display of that object than one where only twenty different cross-sectional images of the same object are displayed. Additionally, a display made in accordance with the invention is relatively small compared to prior techniques such as the mirror mounted on a circular rubber image where reflection of a CRT image is used.

BRIEF DESCRIPTION OF THE DRAWINGS

The various features and advantages of the invention may be more readily understood with reference to the following detailed description taken in conjunction with the accompanying drawings, in which.

DETAILED DESCRIPTION OF THE INVENTION

Figure 1:
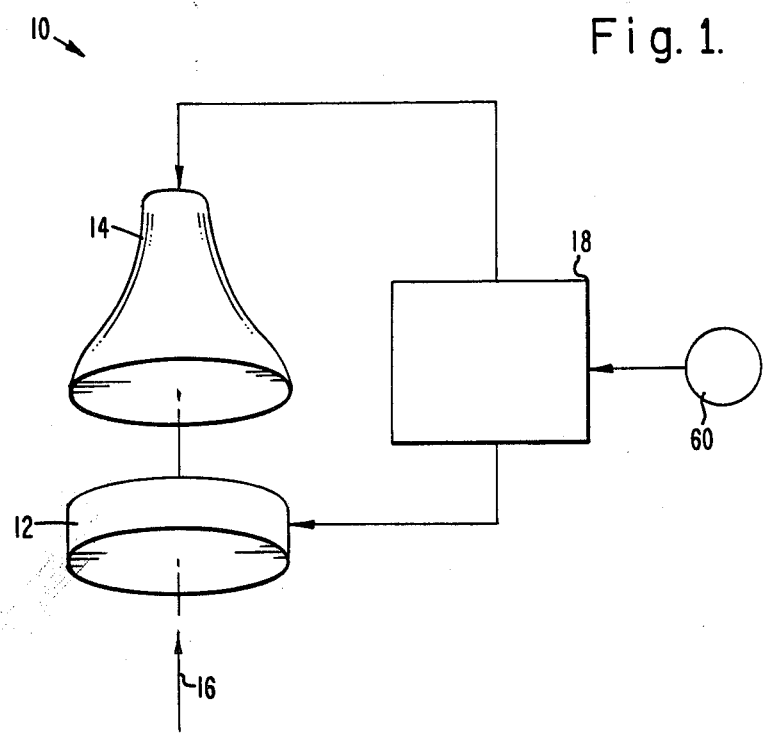
FIG. 1 is a block diagram of a three-dimensional display in accordance with the invention.

In the following description, like reference numerals are used to refer to like elements in the different figures where appropriate. Referring with more particularity to FIG. 1, there is shown a block diagram of a three-dimensional display 10 in accordance with the invention. A variable feed focal length lens 12 is positioned in front of a display apparatus 14 which presents twodimensional images. The images displayed by the display apparatus 14 are viewed through the lens 12 such as in the direction shown by arrow 16. Coupled to both the lens 12 and the display apparatus 14 is a controller 18 for controlling the focal length of the lens 12 and the images displayed by the display apparatus 14. As a frame of reference, the display apparatus 14 presents images representative of an object in two dimensions. The third dimension of the object, i.e., the depth dimension, is indicated in FIG. 1 by the arrow 16 and is also termed the Z axis of the display. This dimension is perpendicular to the display apparatus 14 screen and projects out of and into the screen.

Figure 2A:
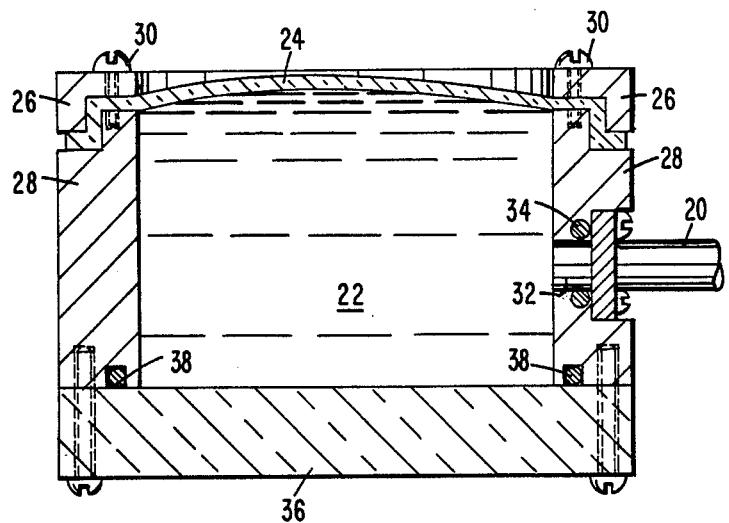
FIG. 2a is a side, cross-sectional view of a fluid-filled lens usable in the invention.
Figure 2B:
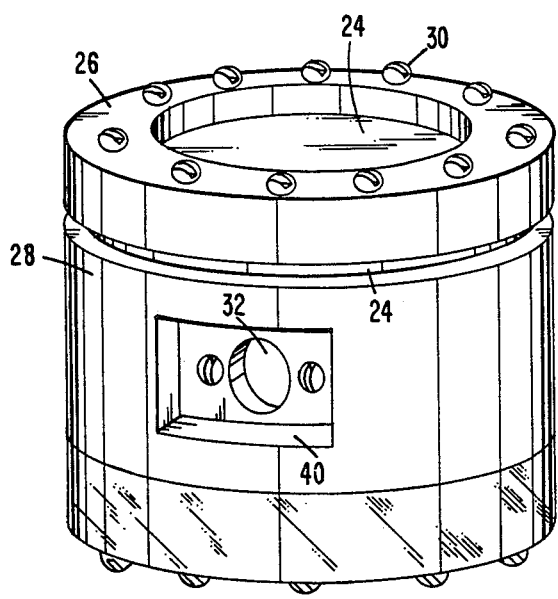
FIG. 2b is a perspective side view of a fluid-filled lens usable in the invention.

A variable focal length lens usable in the invention is shown in FIGS. 2a and 2b. The lens 12 is fluid-filled and is shown with part of a pressure modulator 20 mounted on one side (FIG. 2a). The pressure modulator 20 is used to vary the pressure of the fluid 22 in the lens 12 to thereby vary the focal length of the lens 12. The pressure modulator 20 may be part of or is coupled to the controller 18 (FIG. 1).

In the lens 12 shown in FIGS. 2a and 2b, one optical surface is flexible in order to change the focal length of the lens 12 in response to pressure changes in the fluid 22. In one embodiment, an optically transparent, elastic membrane 24 is used which flexes in response to the fluid 22 pressure changes. As shown in the cross section view of FIG. 2a, the elastic membrane 24 is placed over one lens opening and clamped around the periphery thereof with a ring type clamp 26. This clamp 26 is shown in perspective in FIG. 2b. The membrane 24 is placed over the frame 28 of the lens 12 and held in place by the ring clamp 26. Screws 30 are used to secure the ring clamp 26 in this embodiment. Representative ring clamp screws are indicated by numeral 30 in FIGS. 2a and 2b. Since the membrane also acts as a fluid seal, the ring clamp 26 is shaped accordingly and the number of screws 30, their spacing and their tightness are selected accordingly. In FIG. 2a, the lens 12 is shown with relatively high fluid pressure and the elastic membrane 24 is protruding outward resulting in a convex optical surface. Where fluid pressure is reduced, the elastic membrane may protrude inward resulting in a concave optical surface.

The elastic membrane may be made of a suitable, optically transparent material such as a plastic, for example, Mylar. In one embodiment, the plastic film sold as Saran Wrap by the Dow Chemical Co., Indianapolis, Indiana, was used for the elastic membrane 24. Depending on the application, the membrane 24 may be subject to the weight of the fluid 22 and must be strong enough to withstand such force.

In one embodiment, the optical surface 36 of the lens 12 opposite the membrane 24 is a rigid material such as optically transparent glass. Due to aberrations induced by certain types of membranes 24, such as one of uniform thickness, and other aberrations existing in the lens 12, the opposite optical surface 36 may be shaped or ground as appropriate to correct for the aberrations. In one embodiment, it was found that ¼ inch Plexiglass was usable.

In some applications, it may be found that a second elastic membrane or other flexible material may be required for this opposite optical surface 36. However, in the case of using a rigid surface such as ground glass, ruggedization of the display 10 is facilitated. The lens 12 may be oriented in the display 10 such that the elastic membrane 24 faces the display apparatus 14 (FIG. 1) and the rigid surface 36 faces the viewer. Thus, the critical, focal length controlling surface of the lens is not exposed while a rigid surface is.

The fluid 22 used in the lens 12 is optically transparent and is selected to have a particular optical index of refraction for producing the desired focal length change in the lens for change in pressure of the fluid 22 and change in curvature of the elastic membrane 24. The amount of change of the focal length of the lens 12 is selected so as to be able to display the complete depth of the object. Where the required change in focal length is relatively small, a fluid having a low index of refraction, such as water, may be used. Where the required change is relatively great, optical index oils having higher indexes of refraction, such as part number 48218140, supplied by Van Walters and Rogers, 15408 Blackburn, Norwalk, Calif. 90650, may be used.

The frame 28 of the lens 12 may be formed of a suitable rigid material such as aluminum. Since fluid is used in the lens 12, the frame 28 should have seals as appropriate. As is shown in FIGS. 2a and 2b, the frame 28 of the lens 12 has an aperture 32 where the pressure modulator 20 is connected. In one embodiment, a circular rubber seal 34 shown in a cross section view in FIG. 2a, is included between the frame 28 and the modulator 20. An appropriate groove may be formed in the frame 28 to accommodate this seal 34. Also, as shown in a cross-sectional view in FIG. 2a, the rigid optical surface 36 of the lens opposite the membrane 24 has a rubber seal 38 associated with it. A groove has been formed in the frame 28 to accommodate this seal 38.

One technique for coupling the modulator 20 to the lens frame 28 is shown in FIG. 2b. A recess 40 is formed into the frame 28 at a suitable position, and an aperture 32 into the fluid cavity of the lens is formed in the recess 40. Although the outer surface of the frame 28 of the lens 12 is curved, the recess 40 may be formed flat to facilitate connection to the modulator 20.

Figure 3:
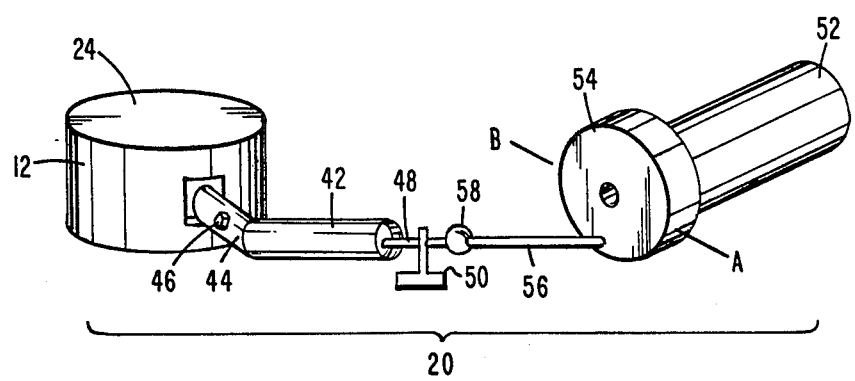
FIG. 3 is a diagrammatic view of a lens fluid pressure modulator arrangement usable in one embodiment of the invention.

A pressure modulator 20 which may be used in the invention comprises a brass piston fitted inside a length of copper tubing. By moving the piston in the tubing, the pressure in the lens may be changed. This arrangement is shown diagrammatically in FIG. 3 where the tubing has two parts: a first part 42 within which the piston is fitted, and a second part 44 having an elbow bend. Inserted in the second part 44 of the tubing is a bleed valve 46. The second part 44 of the tubing connects with the aperture 32 in the lens frame 28 and forms a fluid-tight seal with the recess 40. Connected to the piston (not shown) is a rod 48 and a guide 50 for the rod 48. Also shown in FIG. 3 is a motor 52 for turning a cam 54 to which a second rod 56 is connected. The second rod 56 is connected to the first rod 48 at a connector joint 58 where the motion of the cam 54 is translated into linear motion for the piston. Thus, the amount of motion originated by the cam 54 and translated into fluid pressure changes by the piston and tubing arrangement will control the focal length of the lens 12 by changing the shape of the elastic membrane 24 of the lens 12.

In accordance with the invention, the focal length of the lens 12 is varied while a particular two-dimensional image or a particular sequence of different two-dimensional images is presented by the display apparatus 14. Since the viewer sees the image or images through the lens 12 which is varying in focal length, a three-dimensional display is created. In one embodiment, a single two-dimensional image was presented by the display apparatus 14. The lens 12 and pressure modulator 20 were configured as shown in FIG. 3. The focal length of the lens 12 was swept through its variation range by the arrangement of FIG. 3. The motor 52 turned the cam 54 at a constant speed which caused the piston to move in and out of the copper tubing 42 at a sinusoidal rate thus sweeping the lens 12 through a sequence of focal lengths. Since the same image was constantly presented by the display apparatus 14, the three-dimensional image created by the display 10 was uniform in the depth dimension. The amount of depth of the image may be changed by changing the cam 54 size or the connecting point of the second rod 56 to the cam 54 or by other means.

In another embodiment, the two-dimensional images presented by the display apparatus 14 are changed for certain focal lengths of the lens 12. With this arrangement, images representative of different cross sections of the object may be presented in synchronization with certain focal lengths of the lens 12. The viewer would see different cross sections at different focal lengths. One technique for accomplishing this is to sweep the lens 12 through its focal length variation range by an arrangement such as that shown in FIG. 3. A controller 18, such as that shown in FIG. 1., senses the position of the shaft of the motor 52 and causes the appropriate image to be presented by the display apparatus 14. As an example, in the embodiment shown in FIG. 3, a controller could sense the positions of the shaft of the motor 52 which result in the shortest and longest focal lengths of the lens 12, positions A and B. At those particular positions, the controller would cause the display apparatus to present the foremost and rearmost images of the object. For focal lengths inbetween those two, the controller would cause the display apparatus to present the appropriate interim image. Motor shaft position may be sensed by devices such as a shaft position encoder. With this embodiment, the depth dimension of the object may be presented accurately.

In another embodiment, the display apparatus 14 and the lens 12 may be more closely synchronized by the controller 18. The controller 18 may cause the display apparatus 14 to scan through a series of images of the object, the images being representative of the object along selected increments of its Z, or depth axis, thus presenting a series of two-dimensional "image planes" of the object. These image planes correspond to a view of the object at a particular volume depth. The three-dimensional display is created by the controller 18 causing the focal length of the lens to change with the particular image plane being presented. An accurate fluid pressure control may be employed such as using a stepper motor for the motor 52 in FIG. 3. By scanning through the image planes and focal length changes of the lens at a rate which is faster than the retention rate of the human eye, the image planes displayed appear to fuse into a coherent three-dimensional volume image. A rate of approximately 30 Hertz has been found acceptable in one embodiment of the average viewer.

The controller 18 may also size particular displayed images on the display apparatus 14 to produce the proper perspective of the object when viewed through the lens 12. Typically the image data for presentation by the display apparatus 14 is generated by a host computer. In one embodiment, the controller 18 may receive the image data from the host computer on a data line 60 and control the presentation of the image data by the display apparatus 14 to coincide with the particular focal length of the lens 12. In another embodiment when only a single image is presented by the display apparatus, the host computer may directly provide the image data to the display apparatus 14 rather than through the controller 18.

For the display apparatus 14, it has been found that a high speed, high resolution cathode ray tube (CRT) works well. A CRT such as the HP 1310B CRT Display made by the Hewlett Packard Company, 1820 Embarcadero Road, Palo Alto, Calif. 94303, has been found to function well in one embodiment. A high resolution three-dimensional image may be presented by using a high resolution two-dimensional display such as the CRT above and presenting a large number of closely spaced, cross-sectional images of the displayed object. Very fine detail of the depth dimension of the object may be presented by such images coupled with accurate control over the lens focal length. A controller 18 usable in the invention is the AM 2901C Four Bit Bipolar Microprocessor Slice made by Advanced Micro Devices, 901 Thompson Place, Sunnyvale, Calif. 94088. It was found in one embodiment that coupling four of these four bit processors together resulted in a sixteen bit processor usable in the invention.

By means of the invention, viewers can view complex situations in three dimensions. The invention is capable of displaying images with the same perspective as seen in the real world. The viewer does not need special glasses or other viewing aids to view the three-dimensional display. A viewer, who is viewing the displayed object through the lens 12 has the ability to view the display from greater viewing angles than some prior techniques and can see different areas of the displayed object such as the top, bottom, and sides. The viewer is not confined to a particular viewing angle.

A three-dimensional display in accordance with the invention where a fluid-filled lens, such as that described above, is used will occupy less space than the speaker type technique because it can support large variations in focal length in a confined space. Also the display in accordance with the invention can be militarized because it can be assembled in a relatively small package, there are no exposed critical optical surfaces, and it can be serviced in the field relatively easily. A lens can be replaced as a whole and any fluid vacancies can be bled relatively easily. No special handling of any exposed optical surfaces is required as opposed to prior techniques where moving mirror were used and the display required special handling due to the sensitivity of the components.

Thus, there has been shown and described a new and useful three-dimensional display. Although the invention has been described and shown in detail, it is anticipated that modifications and variations may occur to those skilled in the art which do not depart from the inventive concepts. It is intended that the invention be limited only by the scope of the claims, not by the description, and so the invention will include such modifications and variations unless the claims limit the invention otherwise.

What is claimed is:

1. A display apparatus for presenting a three-dimensional image of an object to a viewer, comprising:

display means for presenting a two-dimensional image representative of the cross section of the object at different positions along the third dimension thereof;

a fluid filled, variable focal length lens disposed in front of the display means through which the viewer directly views the display means and the two-dimensional image presented thereby, one optical surface of the lens comprising an elastic membrane facing said display means, the shape of which controls the focal length of the lens, the membrane shape being responsive to the pressure of the fluid within the lens such that modulating the fluid pressure changes the shape of the membrane thereby changing the focal length of the lens, the optical surface of the lens opposite the elastic membrane comprising an optically transparent, rigid surface facing the viewer, wherein the rigid optical surface is shaped to correct for aberrations in the lens; and control means for controlling the lens so as to change its focal length to a plurality of focal lengths in synchronization with the sequence of images presented by the display means to result in an apparent three-dimensional display of the object.

2. The display apparatus of claim 1, wherein the control means comprises means for modulating the pressure of the fluid within the lens for changing the shape of the elastic membrane thereby changing the focal length of the lens.

3. The display apparatus of claim 1 wherein the focal length of the lens is changed at a rate which is faster than the retention rate of the average human eye.

4. The display apparatus of claim 3 wherein the rate of presentation is approximately 30 Hertz.

5. A display apparatus for presenting a three-dimensional image of an object to a viewer, comprising:

display means for sequentially presenting a plurality of two-dimensional images representative of the cross section of the object at different positions along the third dimension thereof;

a fluid filled, variable focal length lens disposed in front of the display means through which the viewer views the display means and sequence of two-dimensional images presented by the display means, one optical surface of the lens comprising an elastic membrane facing said display means, the shape of which controls the focal length of the lens, the membrane shape being responsive to the pressure of the fluid within the lens such that modulating the fluid pressure changes the shape of the membrane thereby changing the focal length of the lens, the optical surface of the lens opposite the elastic membrane comprising an optically transparent, rigid surface facing the viewer, wherein the rigid optical surface is shaped to correct for aberrations in the lens; and control means for controlling the display means to present the plurality of two-dimensional images in a certain sequence and controlling the lens so as to change its focal length to a plurality of focal lengths in synchronization with the sequence of images presented by the display means to result in an apparent three-dimensional display of the object.

6. The display apparatus of claim 5 wherein the control means comprises means for modulating the pressure of the fluid within the lens for changing the shape of the elastic membrane thereby changing the focal length of the lens.

7. The display apparatus of claim 5 wherein the sequence of the plurality of two-dimensional images is presented at a rate which is faster than the retention rate of the average human eye.

8. The display apparatus of claim 7 wherein the rate or presentation is approximately 30 Hertz.

9. A display apparatus for displaying a three-dimensional image of an object, comprising:

display means for sequentially presenting a plurality of two-dimensional images representative of the cross section of the object at different positions along the third dimension thereof;

a fluid-filled, variable focal length lens through which the viewer directly views the display means, said lens being disposed in front of the display means such that the sequence of two-dimensional images is viewed through the lens, one optical surface of the lens comprising an optically transparent, elastic membrane facing said display means, the shape of which controls the focal length of the lens, the membrane shape being responsive to the pressure of the fluid within the lens such that modulating the fluid pressure changes the shape of the membrane thereby changing the focal length of the lens, the optical surface of the lens opposite the elastic membrane comprising an optically transparent, rigid surface facing the viewer, wherein the rigid optical surface is shaped to correct for aberrations in the lens; and control means for controlling the display means to present the plurality of two-dimensional images and controlling the lens to change its focal length in synchronization with the sequence of images presented by the display means to result in an apparent three-dimensional display of the object at a rate which is faster than the retention rate of the average human eye and including means for modulating the pressure of the fluid within the lens for changing the shape of the elastic membrane to change its focal length in a predetermined sequence wherein the focal length changes are synchronized with the sequence of two-dimensional images.

10. The display apparatus of claim 9 wherein the presentation rate is approximately 30 Hertz.

11. A display apparatus for presenting a three-dimensional image of an object comprising:
   display means for sequentially presenting a plurality of two-dimensional images representative of the cross section of the object at different positions along the third dimension thereof;
   a fluid-filled, variable focal length lens disposed in front of the display means through which the sequence of two-dimensional images is viewed, one optical surface of the lens comprising an elastic membrane, the shape of which controls the focal length of the lens, the membrane shape being responsive to the pressure of the fluid within the lens such that modulating the fluid pressure changes the shape of the membrane thereby changing the focal length of the lens, the optical surface of the lens opposite the elastic membrane comprising an optically transparent, rigid surface, wherein the rigid optical surface is shaped to correct for angular spherical aberrations in the lens; and
   control means for controlling the display means to present the plurality of two-dimensional images in a certain sequence at a rate which is faster than the retention rate of the average human eye and for modulating the pressure of the fluid within the lens for changing the focal length of the lens in a predetermined sequence wherein the focal length changes are synchronized with the sequence of the two-dimensional images.

12. A display apparatus for displaying a threedimensional image of an object to a viewer, comprising:
   cathode ray tube means for sequentially presenting a plurality of two-dimensional images representative of the cross section of the object at different positions along the third dimension thereof;
   a fluid filled lens through which the viewer directly views the plurality of images presented on the cathode ray tube means, said lens having a substantially cylindrical frame, an optically transparent rigid surface affixed in sealed relation to one end of said cylindrical frame so as to face a viewer, and an elastic membrane facing said cathode ray tube means and affixed in sealed relation at the opposite end of said cylindrical frame, the shape of said membrane controlling the focal length of the lens, the membrane shape being responsive to the pressure of the fluid within the lens such that modulating the fluid pressure changes the shape of the membrane, thereby changing the focal length of the lens;
   a recess formed in the side of said cylindrical frame and having an aperture therein providing an opening into the interior of said cylindrical frame;
   a first tube means connected to said aperture and having a piston mounted therein;
   motor means for moving said piston in said tube, thereby changing the pressure of the fluid in the lens and in the tube; and
   control means for controlling the motor means to control the focal length of the lens such that the focal length of the lens corresponds to the particular image being presented by the CRT, said pressure changes in turn causing the focal length of said lens to vary by changing the shape of said elastic membrane.

13. A display apparatus for displaying a three-dimensional image of an object, comprising:
   cathode ray tube means for sequentially presenting a plurality of two-dimensional images representative of the cross section of the object at different positions along the third dimension thereof;
   a fluid filled lens having a substantially cylindrical frame, an optically transparent rigid surface affixed in sealed relation to one end of said cylindrical frame so as to face a viewer, and an elastic membrane facing said cathode ray tube means and affixed in sealed relation at the opposite end of said cylindrical frame, the shape of said membrane controlling the focal length of the lens, the membrane shape being responsive to the pressure of the fluid within the lens such that modulating the fluid pressure changes the shape of the membrane, thereby changing the focal length of the lens;
   a recess formed in the side of said cylindrical frame and having an aperture therein providing an opening into the interior of said cylindrical frame;
   a first tube means connected to said aperture and having a piston mounted therein;
   a first rod connected to said piston; a cam means;
   a motor means for turning said cam means;
   a second rod connected to said cam means;
   means connected to said first and second rods for translating motion of said cam means into linear motion of said first rod, whereby motion of said cam means is translated into pressure changes by said piston means, said pressure changes in turn causing the focal length of said lens to vary by changing the shape of said elastic membrane.

14. The display apparatus of claim 13 wherein said motor means is driven at a constant rate and said cam means drives said piston at a constant rate.

15. The display apparatus of claim 13 wherein said motor is connected to said cam means by a shaft and further including controller means for sensing the position of said shaft and for causing a selected image to be displayed on said cathode ray tube means in response to the position sensed.

16. The display apparatus of claim 15 wherein said motor is a stepper motor.

* * * * *